Figure 1:
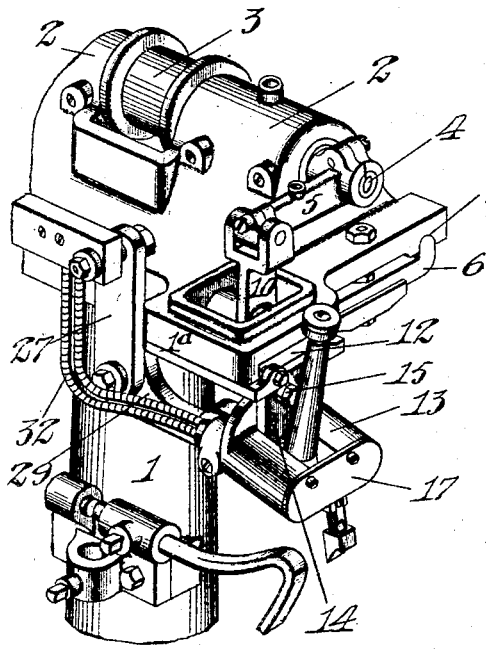

F. M. FURBER.
BURNISHING MACHINE.
APPLICATION FILED FEB. 19, 1915.

1,197,620.

Patented Sept. 12, 1916.

WITNESSES
Elizabeth C. Coufe
O. Blanche Hargraves

INVENTOR
Frederick M. Furber
By his Attorney
Nelson W. Howard

UNITED STATES PATENT OFFICE.

FREDERICK MARTIN FURBER, OF REVERE, MASSACHUSETTS, ASSIGNOR TO UNITED SHOE MACHINERY COMPANY, OF PATERSON, NEW JERSEY, A CORPORATION OF NEW JERSEY.

BURNISHING-MACHINE.

1,197,620. Specification of Letters Patent. Patented Sept. 12, 1916.

Application filed February 19, 1915. Serial No. 9,344.

*To all whom it may concern:*

Be it known that I, FREDERICK M. FURBER, a citizen of the United States, residing at Revere, in the county of Suffolk and State of Massachusetts, have invented certain Improvements in Burnishing-Machines, of which the following description, in connection with the accompanying drawings, is a specification, like reference characters on the drawings indicating like parts in the several figures.

This invention relates to burnishing machines and particularly to burnishing machines used in the manufacture of boots and shoes. It is especially concerned with that type of burnishing machines in which the burnishing iron or tool is given a rapid vibratory motion, and is herein shown as embodied in a so-called edge-setting machine, for burnishing the edges of the soles of shoes.

It is customary in burnishing machines, to heat the burnishing iron in order to produce the best quality of work. Gas and steam have been used heretofore to heat the irons but have proved unsatisfactory because of the unavoidable clumsiness of construction, the uncleanliness and waste of heat and consequent expense and discomfort which attend their use, and for other reasons. It has already been proposed to use electric power to heat the irons of burnishing machines, but in the vibrating-tool type of machine the electric heating unit has heretofore been attached to the vibrating-tool carrier and considerable difficulty has been experienced owing to the disintegration of the materials composing the unit under the severe stresses caused by the vibration.

It is an important object of my invention to provide an electrically heated vibrating-tool burnishing machine in which the tools shall be properly and economically heated without mounting the unit upon the vibrating portion of the mechanism.

To this and other ends which will be pointed out in the following specification and claims, my invention comprises several features, one of which is the provision of an electrically heated vibrating-tool burnishing machine in which the electric unit is mounted fixedly on the frame of the machine near the oscillating tool carriage.

Another feature of the invention consists in a vibrating-tool carrier, which envelops an independently supported electrical unit, whereby the heat generated by the unit is conserved and conveyed to the burnishing irons.

A further feature of the invention is the provision of an electrically heated burnishing machine in which the heat is communicated to the burnishing tools by radiation, as distinct from convection or conduction.

Another feature of the invention is the provision of a vibrating-tool burnishing machine having a tool carrier which is capable of assuming a plurality of operative positions and is electrically heated by a unit mounted on the frame of the machine.

Other features of the invention comprising certain details of construction and combinations of parts will be later described and claimed.

Figure 2:
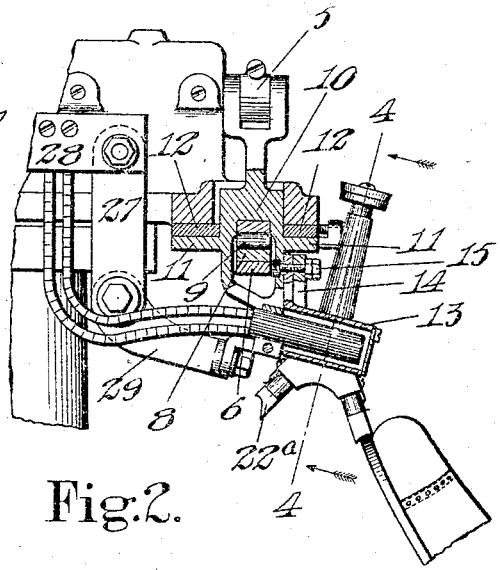
Figure 3:
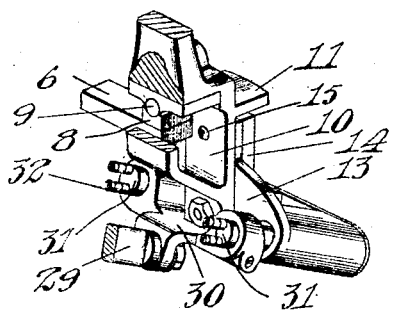
Figure 4:
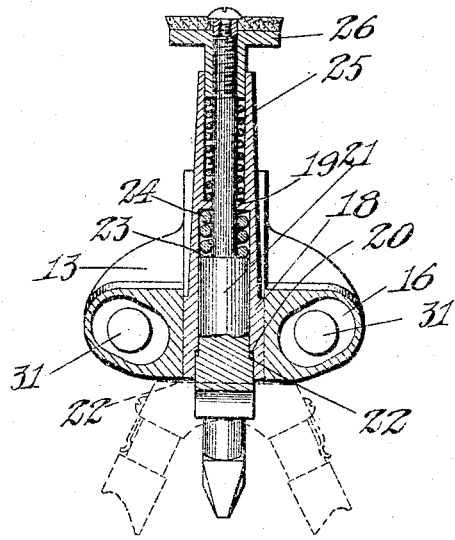

In the drawings, which show a preferred embodiment of the invention in a vibrating-tool edge setting machine, Figure 1 is a perspective view of the machine; Fig. 2 is an enlarged transverse section; Fig. 3 is an enlarged perspective of the rocker frame and electric heating appliance, and Fig. 4 is a section on the line 4—4 of Fig. 2.

The standard 1 carries a head 1ᵃ and the bearings 2 in which revolves the main shaft carrying the pulley 3. The main shaft has a wrist pin 4 at its end, on which the link 5 is mounted. The bar 6 is mounted under the head of the machine, with one end resting in a slot 7 and the other end carrying a block 8, having a cylindrical half bearing for the roller 9. Swinging on the roller 9 is a rocker frame 10, the upper end of which is pivoted to the end of the link 5. The rocker frame has two convex shoulders 11 which rest against fiber plates 12 in the underside of the head. The lower end of the rocker frame has the bifurcated casing 13 and the tool holder 14 attached to it by the bolt 15. The tool holder is mounted between the bifurcations of the casing 13. Each bifurcation has a hole 16, of oblong cross section, the longer axis of the cross section lying substantially in the direction of motion of the casing when rocked by the rocker frame. A plate 17 is mounted across the outside ends of the holes 16.

The tool holder has a body 18 with an internal bore divided into upper and lower compartments by an annular shoulder 19 and having a shoulder 20 near its bottom. The tool carrier 21 (with shoulders 22, 23), is mounted in the bore. The shoulder 22 is elongated and carries a plurality of irons 22ª. The bore of the body 18 widens out longitudinally below the shoulder 20 to receive the elongated shoulder 22. A heavy spring 24 is mounted between the shoulders 23 and 19 and a light spring 25 is mounted between the shoulders 19 and a leather headed nut 26 at the upper end of the tool carrier. The spring 25 holds the tool carrier up against the spring 24 without substantially compressing it. The spring 24 is of such length that the shoulders 20 and 22 are not normally in contact. The tool carrier is thus resiliently supported against upward pressure. When the nut 26 is depressed by the operator, the spring 25 is compressed, the shoulder 22 is brought below the bottom of the body 18, and the tool carrier may then be rotated 180° under the casing 13 to interchange the positions of the irons.

A bar 27 is mounted on the head and carries a terminal block 28 and an arm 29. The arm 29 carries a head 30 in two sockets in the ends of which are mounted the electrical heating units 31. These units extend into the oblong holes 16, in the casing 13, and owing to the oblong shape of the holes 16, are not struck by the casing 13 as it rocks. The units, being thus independently mounted, are free from the stresses to which a unit mounted on the rocker frame would be subject, and will therefore last many times as long before deteriorating. The units are energized by current passing through the lead wires 32.

It will be seen that I have devised a construction which is strong and practical, and which permits the use of electric units of the ordinary commercial form, thus obviating the expense of providing units specially constructed to resist shocks.

Having described my invention, what I claim as new and desire to secure by Letters Patent of the United States is:—

1. A machine of the class described having, in combination, a fixed frame, a tool carrier having a plurality of tools mounted thereon, and having a plurality of operative positions, and an electric unit for heating said tools mounted on said frame adjacent to said carrier.

2. A machine of the class described having, in combination, a fixed frame, an oscillating tool carrier mounted on said frame and having an aperture, and an electric unit for heating said carrier mounted on said frame and projecting into said aperture.

3. A machine of the class described, having, in combination, a frame, an oscillating tool carrier mounted on said frame and having a recess, and an electric heating unit independently mounted on the frame and projecting into the recess, said recess being constructed and arranged to permit the carrier to vibrate without touching the unit.

4. A machine of the class described having, in combination, a frame, an oscillating tool carrier mounted on said frame and having a hole therein, and an electric heating unit mounted on said frame, and projecting into said hole, said unit having a smaller cross section than said hole whereby oscillation of said tool carrier relative to said unit is permitted.

5. A machine of the class described having, in combination, a frame, an oscillating tool carrier mounted thereon and having a hole of oblong cross section with the large axis of said cross section coinciding substantially with the direction of oscillation of said carrier, and an electric heating unit having a cross-section substantially smaller than that of said hole mounted on said frame and extending into said hole, whereby oscillation of said carrier relative to said unit is permitted.

6. A machine of the class described having, in combination, a frame, an oscillating tool carrier mounted on said frame, a member mounted on each side of said carrier, said members having oblong holes therein, with the long axes of their cross sections substantially parallel to the direction of oscillation of said carrier, and a plurality of substantially circular electric heating units mounted on said frame and projecting into said holes, whereby oscillation of said carrier relative to said units is permitted.

7. A machine of the class described having, in combination, a fixed frame, an electric heating unit mounted thereon, and an oscillating tool carrier constructed and arranged to envelop said unit.

8. A machine of the class described having, in combination, a fixed frame, an oscillating casing mounted on said frame, a spindle carrying a plurality of tools and having a plurality of operative positions, a heat jacket mounted on said casing, and a heating unit mounted on said frame and positioned within said jacket.

In testimony whereof I have signed my name to this specification in the presence of two subscribing witnesses.

FREDERICK MARTIN FURBER.

Witnesses:
CHESTER E. ROGERS,
ABBIE L. FREAR.